US008860892B2

(12) United States Patent
Nam et al.

(10) Patent No.: US 8,860,892 B2
(45) Date of Patent: Oct. 14, 2014

(54) DISPLAY DEVICE AND SYSTEM FOR WIRELESSLY TRANSMITTING/RECEIVING IMAGE SIGNALS

(75) Inventors: Hyoung-Sik Nam, Incheon (KR); Min-Kyu Park, Cheonan-si (KR); Jee-Hoon Jeon, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 474 days.

(21) Appl. No.: 13/165,616

(22) Filed: Jun. 21, 2011

(65) Prior Publication Data

US 2012/0099023 A1 Apr. 26, 2012

(30) Foreign Application Priority Data

Oct. 25, 2010 (KR) ........................ 10-2010-0103955

(51) Int. Cl.
*H04N 5/64* (2006.01)
*H04N 7/16* (2011.01)
*H04M 1/00* (2006.01)
*H04B 1/38* (2006.01)
*G02F 1/1333* (2006.01)

(52) U.S. Cl.
CPC ...................................... *H04N 5/64* (2013.01)
USPC .............. 348/836; 725/139; 455/566; 349/58

(58) Field of Classification Search
USPC ........................................... 348/41–161, 836
See application file for complete search history.

(56) References Cited

U.S. PATENT DOCUMENTS

| | | | | |
|---|---|---|---|---|
| 6,959,209 | B2 * | 10/2005 | Fang | 455/571 |
| 7,930,803 | B2 * | 4/2011 | Ueyama et al. | 16/366 |
| 8,056,109 | B2 * | 11/2011 | Kim et al. | 725/112 |
| 8,094,011 | B2 * | 1/2012 | Faris et al. | 340/539.13 |
| 8,125,772 | B2 * | 2/2012 | Kim | 361/679.24 |
| 8,436,776 | B2 * | 5/2013 | Suh et al. | 343/702 |
| 8,476,532 | B2 * | 7/2013 | Kitano et al. | 174/254 |
| 8,676,116 | B2 * | 3/2014 | Zhu et al. | 455/41.1 |
| 2005/0095980 | A1 * | 5/2005 | Chang | 455/3.02 |
| 2006/0040713 | A1 * | 2/2006 | Kim | 455/566 |
| 2006/0101497 | A1 * | 5/2006 | Hirt et al. | 725/81 |
| 2006/0253870 | A1 * | 11/2006 | Lee | 725/58 |
| 2008/0004082 | A1 * | 1/2008 | Bloebaum | 455/566 |
| 2008/0024594 | A1 * | 1/2008 | Ritchey | 348/36 |
| 2008/0051027 | A1 * | 2/2008 | Lee | 455/3.06 |
| 2008/0120668 | A1 * | 5/2008 | Yau | 725/110 |
| 2008/0125098 | A1 * | 5/2008 | Bruce et al. | 455/414.1 |
| 2008/0309842 | A1 * | 12/2008 | Kim | 349/58 |
| 2009/0021649 | A1 * | 1/2009 | Lee et al. | 348/730 |
| 2009/0313675 | A1 * | 12/2009 | Howarter et al. | 725/119 |
| 2010/0083338 | A1 * | 4/2010 | Chiang | 725/139 |
| 2011/0034223 | A1 * | 2/2011 | O'Leary et al. | 463/2 |

FOREIGN PATENT DOCUMENTS

| | | | |
|---|---|---|---|
| KR | 1020060042518 | A | 5/2006 |
| KR | 1020080070232 | A | 7/2008 |
| KR | 1020090035255 | A | 4/2009 |
| KR | 1020100002499 | A | 1/2010 |

* cited by examiner

*Primary Examiner* — Joseph Ustaris
*Assistant Examiner* — Talha Nawaz
(74) *Attorney, Agent, or Firm* — Innovation Counsel LLP

(57) ABSTRACT

A display device and a system for wirelessly transmitting/receiving an image signal are provided. The display device includes: a display panel that displays an image; an upper housing that is disposed on a front surface of the display panel and has an open window defining a display area; a lower housing that is disposed on a rear surface of the display panel and has a hole formed in a portion of an area corresponding to the display area; and a wireless communication module that is disposed on a rear surface of the lower housing and transmits or receives a wireless signal through the hole.

16 Claims, 6 Drawing Sheets

DISPLAY DEVICE AND SYSTEM FOR WIRELESSLY TRANSMITTING/RECEIVING IMAGE SIGNALS

This application claims priority from Korean Patent Application No. 10-2010-0103955 filed on Oct. 25, 2010 in the Korean Intellectual Property Office, the disclosure of which is incorporated herein by reference in its entirety.

BACKGROUND OF THE INVENTION

1. Field of the Invention

The present invention relates to a display device and a system for wirelessly transmitting/receiving an image signal. More particularly, the present invention relates to a display device including a wireless communication module for wireless communication with an external device and a system for wirelessly transmitting/receiving an image signal.

2. Description of the Related Art

An image display apparatus such as a television typically includes an image processing device (e.g., a set-top box) and a display panel (e.g., a liquid crystal display (LCD) panel). The image processing device receives an image signal from, e.g., a public or cable television network, processes the received image signal and outputs the processed image signal. The display panel displays an image corresponding to the image signal processed by the image processing device.

Until now, the image processing device and display device have been implemented as a single body. However, with the recent development of wireless high-definition (HD) technology, wireless digital televisions in which the image processing device is separate from a display device are used.

In wireless HD technology, the image processing device and display device are implemented as separate devices, and an image signal is exchanged in a wireless manner between the image processing device and the display device. In addition, for wireless transmission/reception of an image signal, the image processing device and the display device each includes an embedded wireless communication module.

Separating the image processing device from the display device has made it possible to satisfy the needs for lighter and slimmer display devices.

SUMMARY OF THE INVENTION

A display device that includes a wireless communication module is provided. The display device has a structure that easily and stably secures a wireless communication path between the display device and another device, and imposes no restrictions on the design of the display device. A system for wirelessly transmitting/receiving an image signal is also provided.

According to one aspect, a display device includes: a display panel that displays an image; an upper housing that is disposed on a front surface of the display panel and has an open window defining a display area; a lower housing that is disposed on a rear surface of the display panel and has a hole formed in a portion of an area of the lower housing corresponding to the display area; and a wireless communication module which is disposed on a rear surface of the lower housing and transmits or receives a wireless signal through the hole.

According to another aspect, there is provided a system for wirelessly transmitting/receiving an image signal. The system includes: an image processing device that receives an image signal from an external source, generates a wireless signal based on the received image signal, and outputs the wireless signal; and a display device that receives the wireless signal from the image processing device and displays an image based on the received wireless signal, wherein the display device includes: a display panel that displays an image; an upper housing that is disposed on a front surface of the display panel and has an open window defining a display area; a lower housing that is disposed on a rear surface of the display panel and has a hole formed in a portion of an area corresponding to the display area; and a wireless communication module that is disposed on a rear surface of the lower housing and at least receives the wireless signal through the hole.

BRIEF DESCRIPTION OF THE DRAWINGS

The above and other aspects and features will become more apparent by describing exemplary embodiments thereof with reference to the attached drawings, in which.

DETAILED DESCRIPTION OF THE INVENTION

Figure 1:
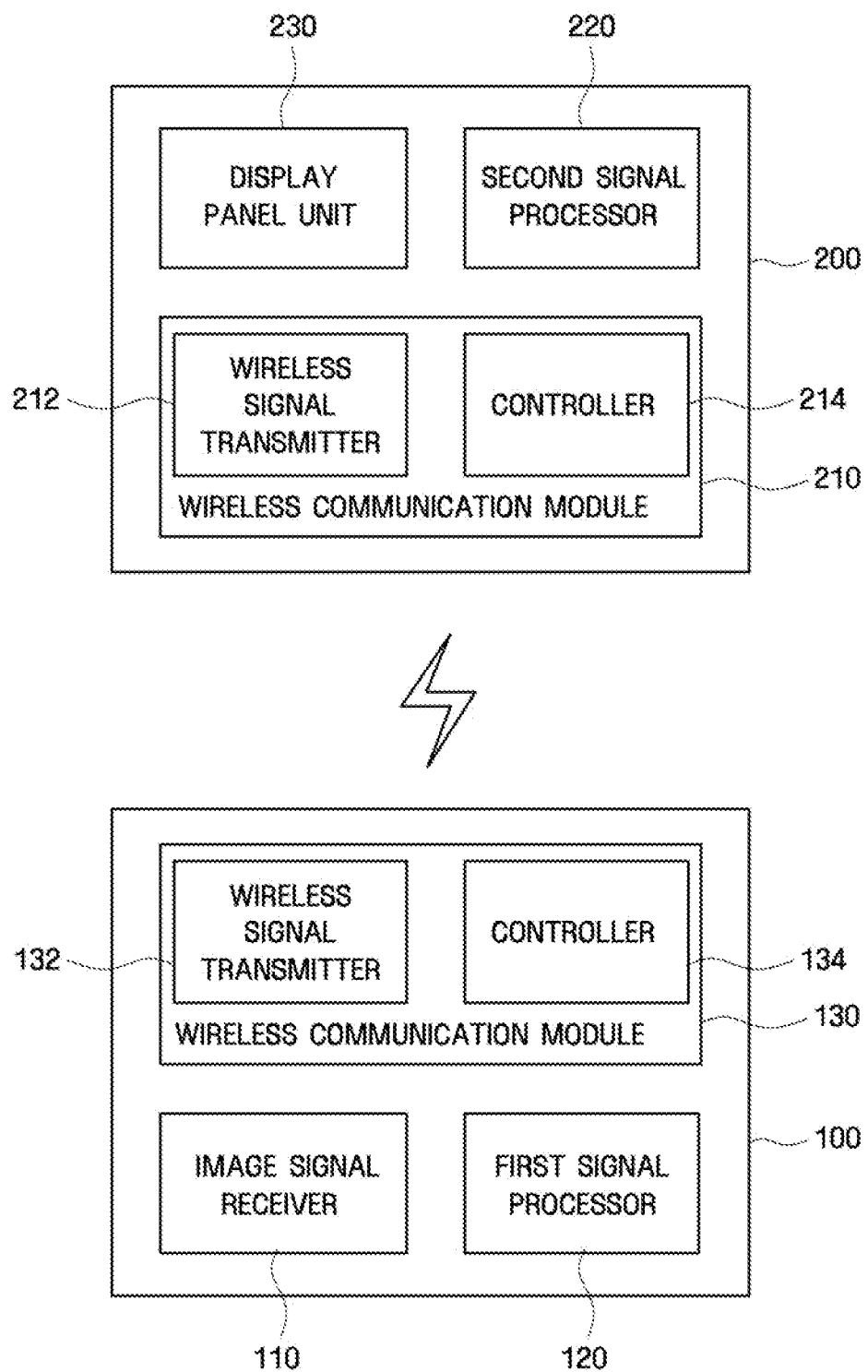
FIG. 1 is a block diagram of a system for wirelessly transmitting/receiving an image signal according to an exemplary embodiment.

Advantages and features of the present disclosure and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. In the drawings, sizes and relative sizes of layers and regions may be exaggerated for clarity.

It will be understood that when an element or layer is referred to as being "on" another element or layer, the element or layer can be directly on another element or layer, or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Like reference numerals refer to like elements throughout the specification.

Exemplary embodiments are described herein with reference to plan and cross-section illustrations that are schematic illustrations of idealized embodiments. As such, variations from the shapes of the illustrations as a result, for example, of manufacturing techniques and/or tolerances, are to be expected. Thus, exemplary embodiments should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device, and are not intended to limit the scope of the invention.

Figure 2:
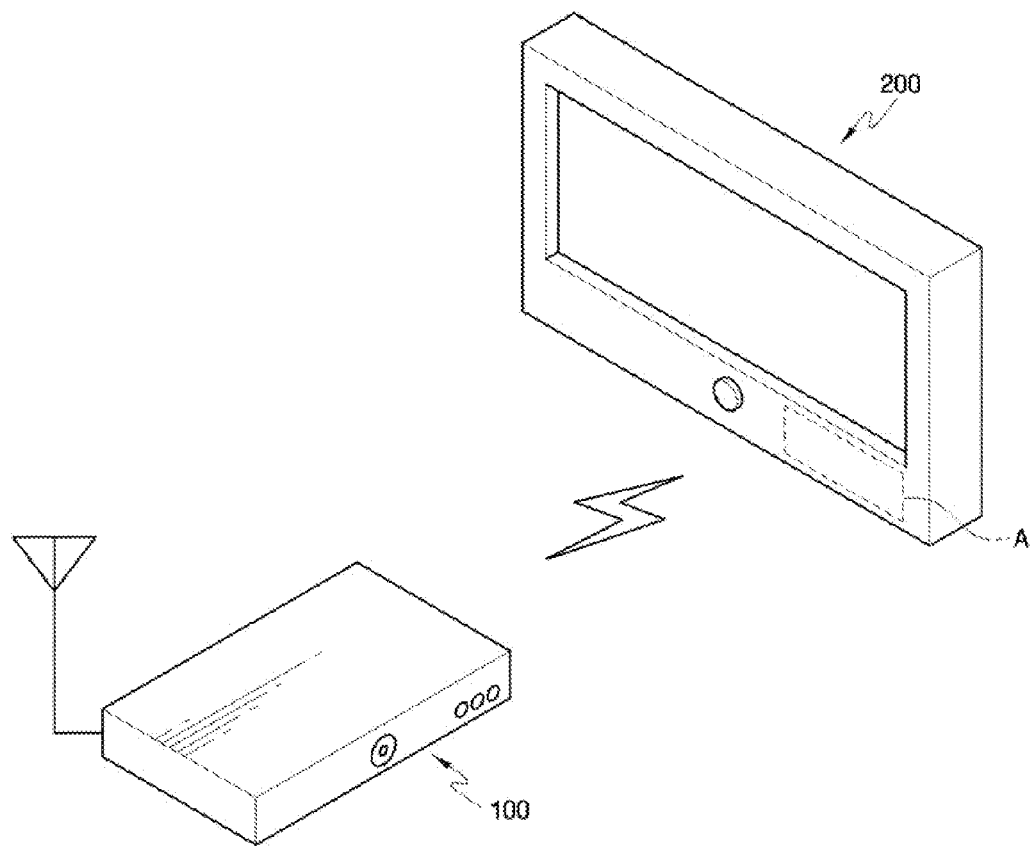
FIG. 2 is a diagram illustrating an example of an actual implementation of the system shown in FIG. 1.

Hereinafter, the concept of a system for wirelessly transmitting/receiving an image signal will be described with reference to FIGS. 1 and 2. FIG. 1 is a block diagram of a system for wirelessly transmitting/receiving an image signal according to an exemplary embodiment. FIG. 2 is a diagram illustrating an example of an actual implementation of the system shown in FIG. 1.

Referring to FIG. 1, the system for wirelessly transmitting/receiving an image signal includes an image processing device 100 and a display device 200. The image processing device 100 receives an image signal from an external device, processes the received image signal, converts the processed image signal into a wireless signal, and outputs the wireless signal. The display device 200 receives the wireless signal from the image processing device 100, converts the wireless signal into an image signal, and displays an image corresponding to the image signal on a screen thereof.

The image processing device 100 may be, for example, a set-top box, a media box, a digital video recorder (DVR), a Blu-ray disc player, or the like. In addition, the display device 200 may be, for example, a flat display panel such as a liquid crystal display (LCD) panel.

In the following description, the term "image" will be understood to broadly refer to any and all elements displayed on the screen, and accordingly, the term "image signal" will be understood to broadly refer to signals used to carry information for producing any and all elements that can be displayed on the screen, including video signals, audio signals, and data signals.

The image processing device 100 and the display device 200 will be described in further detail below.

The image processing device 100 includes an image signal receiver 110, a first signal processor 120, and a wireless communication module 130.

The image signal receiver 110 receives an image signal from an external device (not shown) such as a public or cable television network.

The first signal processor 120 processes the received image signal. For example, the first signal processor 120 may adjust the resolution, format, quality, or the like of the received image signal.

The wireless communication module 130 includes a wireless signal transmitter 132 and a controller 134. The wireless signal transmitter 132 converts the image signal processed by the first signal processor 120 into a wireless signal and outputs the wireless signal. The controller 134 controls the operation of the wireless communication module 130, including, for example, controlling the transmission timing of the wireless signal.

The above elements of the image processing device 100 are illustrated in the drawing to describe the concept of the system for wirelessly transmitting/receiving an image signal. However, as it will be understood by persons of ordinary skill in the art, other elements may be further included in the image processing device 100 in addition to the above elements illustrated in the drawing.

The display device 200 includes a wireless communication module 210, a second signal processor 220, and a display panel unit 230.

The wireless communication module 210 includes a wireless signal receiver 212 and a controller 214. The wireless signal receiver 212 receives a wireless signal output from the wireless signal transmitter 132. The controller 214 controls the operation of the wireless communication module 210, including, for example, controlling the reception timing of the wireless signal.

The second signal processor 220 converts the wireless signal received by the wireless communication module 210 into an image signal.

The display panel unit 230 displays an image, which corresponds to the image signal output from the second signal processor 220, on the screen.

While a minimum number of elements of the display device 200 are illustrated in the drawing to describe the concept of the system for wirelessly transmitting/receiving an image signal, persons of ordinary skill in the art will understand that other elements may further be included in the display device 200 in addition to the above elements illustrated in the drawing.

An example of an implementation of the system structured as described above is illustrated in FIG. 2. Referring to FIG. 2, the image processing device 100 and the display device 200 are implemented as separate devices and are spaced apart from each other by a predetermined distance according to a user's needs. Although the image processing device 100 and the display device 200 are implemented as separate devices, they can wirelessly exchange image signals with each other as described above.

The display device 200 has a front with a display area and a back without a display area. The back of the display device 200 is generally placed adjacent to, for example, a wall such that typically there is substantially no space between the back of the display device 200 and, for example, the wall. On the other hand, the front of the display device 200 faces a wide space. Accordingly, it is difficult to install the image processing device 100 behind the display device 200, and therefore the image processing device 100 is installed at any location in the space in front of the display device 200.

Under the wireless high-definition standard, a wireless signal exchanged between the image processing device 100 and the display device 200 operates in a 60 GHz extremely high frequency (EHF) band and exhibits great linearity. Hence, the best communication quality can be obtained when the wireless communication module 130 of the image processing device 100 and the wireless communication module 210 of the display device 200 face each other, more specifically, when the wireless signal transmitter 132 and the wireless signal receiver 212 shown in FIG. 1 face each other.

Because the image processing device 100 is installed in front of the display device 200 as described above, the wireless communication module 210 is conventionally placed on the front of the display device 200 in order to secure superior communication quality. Further, because the wireless communication module 210 cannot be placed in the display area of the display device 200 such that it would block the display area, it is conventionally placed on a portion (e.g., a portion 'A') of an outside edge of the front of the display device 200 that is not part of the display area. Hereinafter, the outside edge of the front of the display device 200 that excludes the display area will be referred to as a "bezel."

To place the wireless communication module 210 of the display device 200 on the bezel of the display device 200, however, the design (e.g., width) of the bezel needs to be sized to accommodate the wireless communication module 210.

Furthermore, because the bezel of the display device 200 is generally made of a metal material that blocks a wireless communication path, a portion (e.g., the portion "A") of the bezel on which the wireless communication module 210 is to be placed needs to have a hole or should be made of a material other than metal. Consequently, this complicates the process of manufacturing the display device 200.

The following display device according to an exemplary embodiment has a structure that solves all of the above problems and provides a wireless communication path that can be easily manufactured and that is stable. The display device will be described in greater detail with reference to FIGS. 3 through 5.

Figure 3:
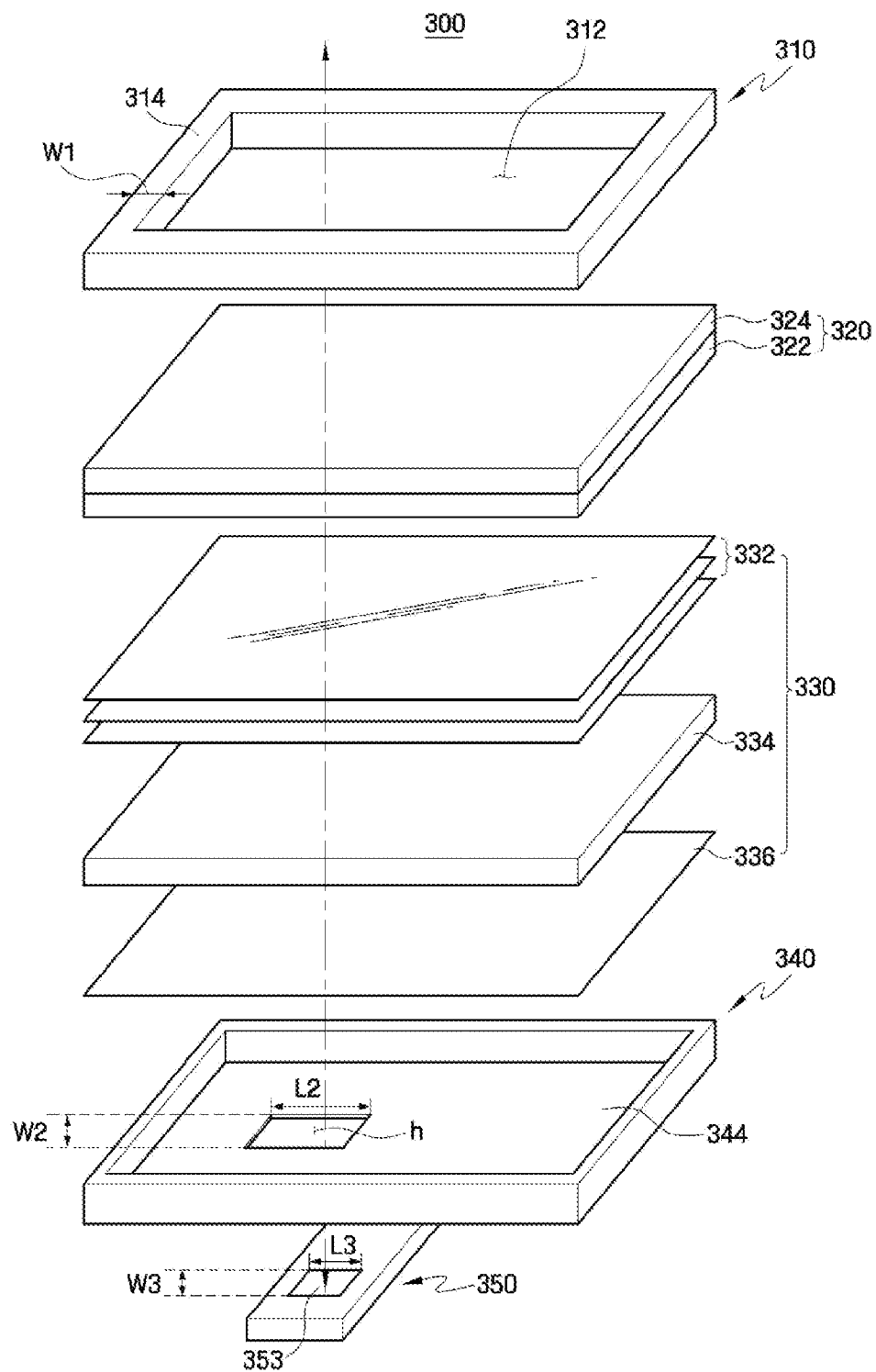
FIG. 3 is an exploded perspective view of a display device according to an exemplary embodiment.
Figure 4A:
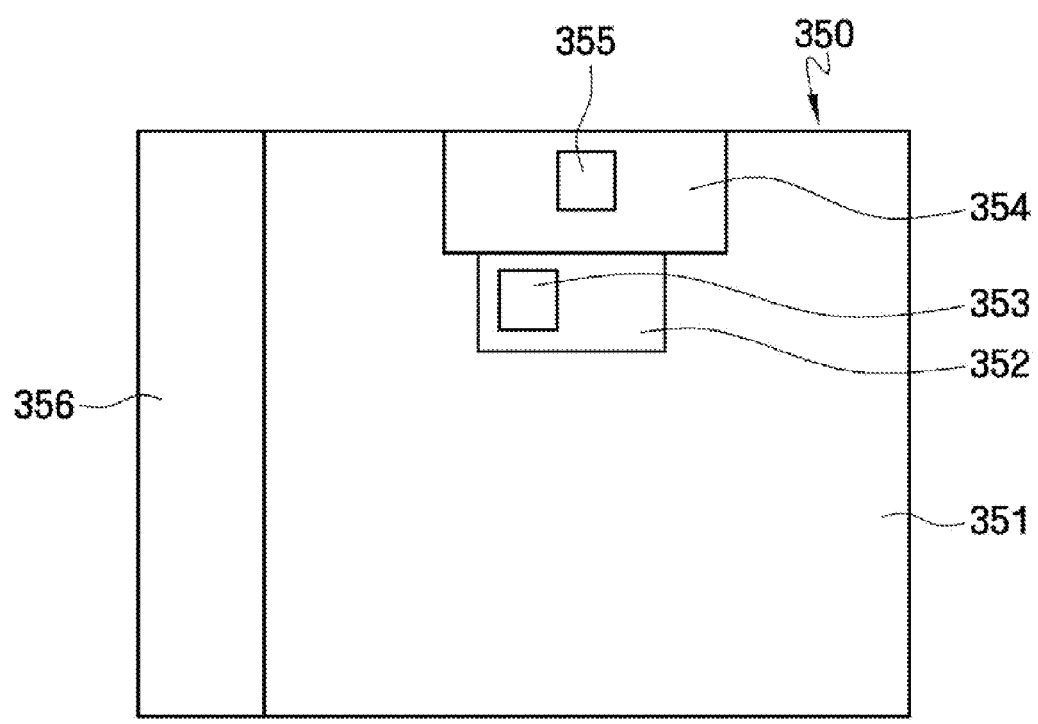
FIG. 4A is a diagram illustrating an example of a wireless communication module shown in FIG. 3.
Figure 4B:
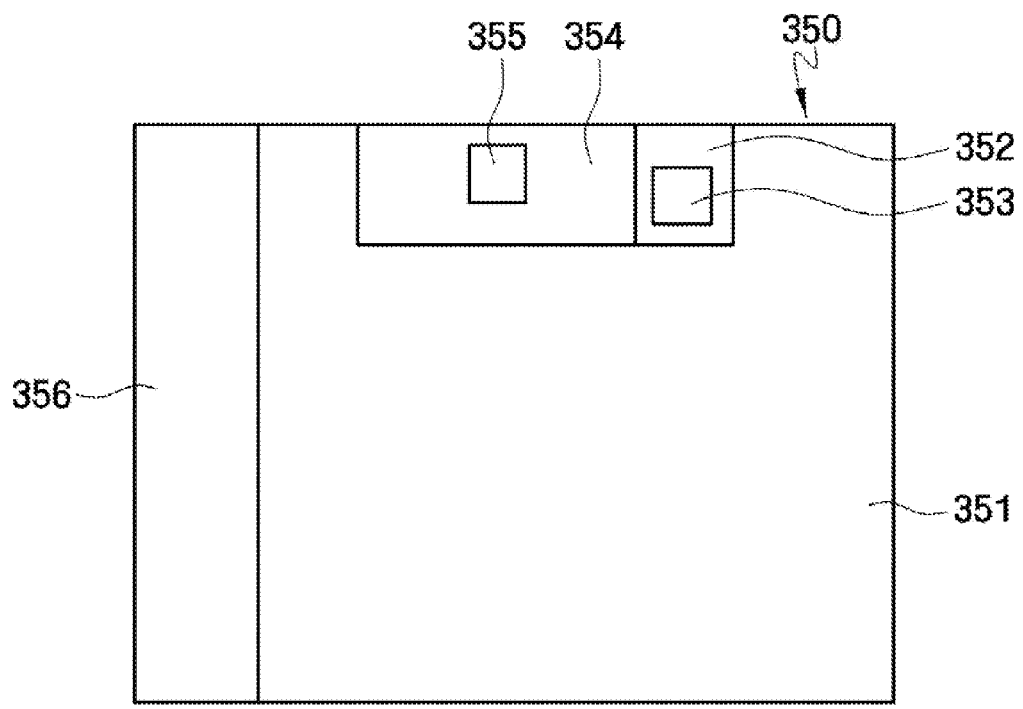
FIG. 4B is a diagram illustrating another example of the wireless communication module shown in FIG. 3.
Figure 5:
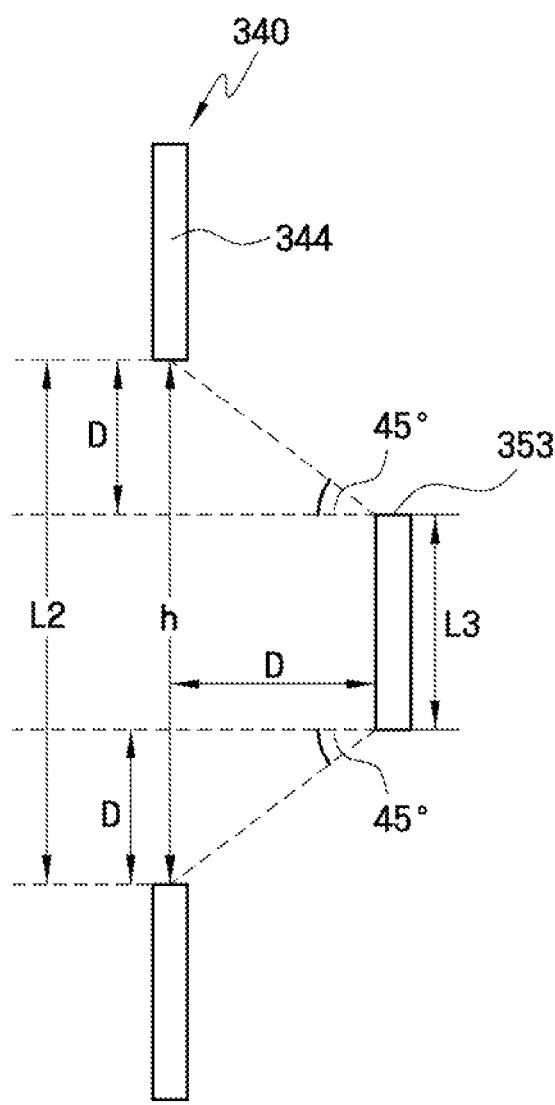
FIG. 5 is a diagram illustrating the positional relationship between a lower housing and the wireless communication module shown in FIG. 3.

FIG. 3 is an exploded perspective view of a display device 300 according to an exemplary embodiment. FIG. 4A is a diagram illustrating an example of a wireless communication module 350 shown in FIG. 3. FIG. 4B is a diagram illustrating another example of the wireless communication module 350 shown in FIG. 3. FIG. 5 is a diagram illustrating the positional relationship between a lower housing 340 and the wireless communication module 350 shown in FIG. 3.

Referring to FIG. 3, the display device 300 according to the current exemplary embodiment includes a display panel 320, which displays an image, an upper housing 310, which is disposed on a front surface of the display panel 320, a backlight assembly 330, which is disposed on a rear surface of the display panel 320, and a lower housing 340, which is disposed on a rear surface of the backlight assembly 330. The lower housing is coupled to the upper housing 310 to accommodate the display panel 320 and the backlight assembly 330. The wireless communication module 350 is disposed on a rear surface of the lower housing 340.

The display panel 320 includes a first display substrate 322 on which thin-film transistors (TFTs) and pixel electrodes are formed, a second display substrate 324 on which a black matrix and a common electrode are formed and which faces the first display substrate 322, and a liquid crystal layer (not shown) which is interposed between the first display substrate 322 and the second display substrate 324. The display panel 320 structured as described above displays an image.

The upper housing 310 provides a space in which the display panel 320 and the backlight assembly 330 can be housed and exposes a portion of the display panel 320 through an open window 312, thereby defining a display area. The upper housing 310 consists of four outer sidewalls and a bezel portion 314 which extends inwards from the sidewalls to surround the open window 312. Hereinafter, an area of the display panel 320 which is exposed by the open window 312 will be referred to as a "display area," and the other area of the display panel will be referred to as a "non-display area."

As will be described in detail below, the wireless communication module 350 of the display device 300 according to the current exemplary embodiment is not overlapped by the bezel portion 314 of the upper housing 310. In other words, the wireless communication module 350 is not overlapped by the bezel portion 314 of the upper housing 310 in a direction in which the upper housing 310, the display panel 320, the backlight assembly 330, the lower housing 340, and the wireless communication module 350 are stacked, that is, in a vertical direction (indicated by the dashed line) of FIG. 3. Therefore, the presence of the wireless communication module 350 does not place any restrictions on the design of the upper housing 310. For example, a width W1 of the bezel portion 314 is not restricted.

The upper housing 310 may be formed by sheet metal working of a metal plate. However, the material of the upper housing 310 and a method of manufacturing the upper housing 310 are not limited to this example and may vary.

The backlight assembly 330 includes optical sheets 332, a light guide plate (LGP) 334, and a reflective sheet 336.

The LGP 334 guides light emitted from light source (not shown) to the optical sheets 332. Although not shown in the drawing, a light source may be located on a side or rear surface of the LGP 334.

The optical sheets 332 diffuse and concentrate light received from the LGP 334 and include a prism sheet, a diffusion sheet, and a protective sheet.

The reflective sheet 336 increases optical efficiency by reflecting light output from the rear surface of the LGP 334 in a forward direction, that is, toward the display panel 320.

The configuration of the backlight assembly 330 is not limited to the current exemplary embodiment and may vary according to the requirements of the display device 300. For example, the number of the optical sheets 332 or the reflective sheets 336 or the position of the optical sheets 332 or the reflective sheet 336 can be changed.

Together with the upper housing 310, the lower housing 340 provides a space in which the display panel 320 and the backlight assembly 330 are accommodated. The lower housing 340 is coupled to the upper housing 310 by, e.g., a coupling member (not shown). The lower housing 340 consists of four sidewalls and a bottom portion 344.

The lower housing 340 may be formed by sheet metal working of a metal plate. However, the material of the lower housing 340 and a method of manufacturing the lower housing 340 are not limited to this example and may vary.

A hole h is formed in the bottom portion 344 of the lower housing 340. In particular, the hole h is formed in an area of the bottom portion 344 which corresponds to the display area. Accordingly, the hole h is not overlapped by the bezel portion 314 of the upper housing 310 in the direction in which the upper housing 310, the display panel 320, the backlight assembly 330, the lower housing 340, and the wireless communication module 350 are stacked, that is, in the vertical direction of FIG. 3. This is because the hole h is used as a wireless communication path for the wireless communication module 350, as will be described in further detail below.

In the present exemplary embodiment, one rectangular hole h is illustrated in the drawing. However, the embodiments are not limited thereto. The hole h may have various shapes, such as, for example, a circle, an ellipse, a quadrilateral or any other polygon. Additionally, the number and position of the holes h may vary. In the current exemplary embodiment, a width of the rectangular hole h in a first direction is indicated by reference character W2, and a width of the rectangular hole h in a second direction intersecting the first direction is indicated by reference character L2.

The wireless communication module 350 is disposed on the rear surface of the lower housing 340. The configuration of the wireless communication module 350 implemented as a device may be substantially the same as that of the wireless communication module 210 shown in FIG. 1.

The wireless communication module 350 will now be described in further detail with reference to FIGS. 4A and 4B. FIGS. 4A and 4B are diagrams respectively illustrating examples of the wireless communication module 350 shown in FIG. 3. The wireless communication modules shown in FIGS. 4A and 4B include the same elements, but they differ in the arrangement of those elements.

Referring to FIGS. 4A and 4B, the wireless communication module 350 includes a wireless signal receiver 353 and a controller 355. The wireless communication module 350 may further include other elements having necessary functions, for example, a power supply unit 356.

The wireless signal receiver 353, which receives a wireless signal, may be implemented as a single chip, e.g., a radio frequency (RF) chip. The wireless signal receiver 353 is loaded on a first board 352. The controller 355 controls the operation of the wireless communication module 350, including, for example, controlling the reception timing of a wireless signal. The controller 355 may also be implemented as a single chip, e.g., a timing controller (TCON) chip, and is loaded on a second board 354. The power supply unit 356 supplies power to the wireless communication module 350 and may be, for example, a lips (LCD integrated power supply) board.

The first board 352 loaded with the wireless signal receiver 353 and the second board 354 loaded with the controller 355 are loaded on a motherboard 351. In addition, the power supply unit 356 is loaded on the motherboard 351. Although not shown in the drawings, circuit units having other necessary functions may further be loaded on the motherboard 351.

The first board 352 loaded with the wireless signal receiver 353 adjoins the second board 354 loaded with the controller 355. When the first board 352 and the second board 354 adjoin each other, they can be connected to each other without an additional cable. The first board 352 and the second board 354 may adjoin each other in a vertical direction as shown in FIG. 4A or in a horizontal direction as shown in FIG. 4B. However, the present invention is not limited thereto, and, for example, the adjoining surfaces of the first board 352 and the second board 354 may vary, or the direction in which the first and second boards 352 and 354 adjoin each other may vary.

Although not shown in the drawings, the wireless signal receiver 353 and the controller 355 may be loaded onto a single board.

The position of the above-structured wireless communication module 350 in the display device 300 will now be described with reference again to FIG. 3.

Referring back to FIG. 3, the wireless communication module 350 is disposed on the rear surface of the lower housing 340. In the wireless communication module 350, the wireless signal receiver 353, in particular, which receives the actual wireless signal, is placed in a position on the back of lower housing 340 that corresponds to the position of hole h. The wireless signal receiver 353 implemented as, for example, an RF chip, is square in the current exemplary embodiment. A width of the wireless signal receiver 353 in the first direction is indicated by reference character W3, and a width of the wireless signal receiver 353 in the second direction intersecting the first direction is indicated by reference character L3.

A method of exchanging a wireless signal between the display device 300 of FIG. 3 and an image processing device (not shown in FIG. 3) will now be described.

The image processing device not shown in the drawing FIG. 3 is located in front of the display device 300 and is spaced apart from the display device 300 by a predetermined distance.

When the image processing device outputs a wireless signal based on an image signal, the wireless signal receiver 353 of the wireless communication module 350 included in the display device 300 receives the wireless signal. That is, the wireless signal receiver 353 receives the wireless signal from the image processing device through the hole h formed in the bottom portion 344 of the lower housing 340.

More specifically, a wireless signal output from the image processing device travels along a wireless communication path indicated in FIG. 3 by a dashed arrow, to be received by the wireless signal receiver 353. The wireless signal enters the wireless signal receiver 353 through the hole h formed in the bottom portion 344 of the lower housing 340 after passing through the open window 312 of the upper housing 310, the display panel 320, the optical sheets 332, the LGP 334, and the reflective sheet 336. From this point of view, it can be understood that the hole h is used as a wireless communication path between the image processing device and the display device 300.

Because the upper housing 310 and the lower housing 340 are made of metal plates as described above, they block the wireless communication path. However, because the display panel 320, the optical sheets 332, the LGP 334, and the reflective sheet 336 are made of transparent materials, they do not block the wireless communication path.

Therefore, as in the current exemplary embodiment, the hole h is formed in an area of the bottom portion 344 of the lower housing 340 which corresponds to the display area, and the wireless communication module 350 is placed on a rear surface of the bottom portion 344 of the lower housing 340 such that the wireless signal receiver 353 is placed in a position that corresponds to the position of hole h. Furthermore, any material (such as metal) that blocks the wireless communication path is not placed in the way of the wireless communication path indicated by the dashed arrow. Thus, a wireless signal travels through the open window 312 of the upper housing 310 and the hole h of the lower housing 340.

This allows the wireless communication module 350 to be disposed on the rear surface of the lower housing 340 without compromising or diminishing the communication quality between the image processing device and the display device 300.

Furthermore, because the wireless communication module 350 is located on the rear surface of the lower housing 340, and not on the bezel portion 314 of the upper housing 310, no restrictions are placed on the design of the bezel portion 314, and the width W1 of the bezel portion 314 can be adjusted as desired by a designer.

The display device 300 described above is a device that receives a wireless signal from the image processing device. However, the present invention is not limited thereto and may expand in its concept. For example, the display device 300 may receive wireless signals from devices other than the image processing device. Alternatively, the display device 300 may transmit wireless signals to the image processing device or other devices. To this end, the wireless communication module 350 may include a wireless signal transmitter which transmits wireless signals to the image processing device or other devices. In this case, to transmit wireless signals, the wireless signal transmitter may be placed in a position that corresponds to the position of hole h.

For ease of description, an element that can transmit or receive a wireless signal will hereinafter be referred to as a "wireless signal transceiver." The wireless signal transceiver may denote the wireless signal receiver 353, a wireless signal transmitter, or a device that can both transmit and receive a wireless signal. When the wireless signal transceiver is included in the wireless communication module 350, it may be placed at a position that corresponds to the position of hole h so as to be able to transmit or receive a wireless signal.

The positional relationship between the lower housing 340 and the wireless communication module 350 shown in FIG. 3 will be described in further detail with reference to FIG. 5. Particularly, the relationship between the position and size of the hole h formed in the lower housing 340 and the wireless signal receiver 353 of the wireless communication module 350 will be described.

Referring to FIG. 5, the wireless signal receiver 353 of the wireless communication module 350 is separated from the bottom portion 344 of the lower housing 340 by a predetermined distance D. In addition, referring to FIG. 3, the rectangular hole h formed in the bottom portion 344 of the lower housing 340 has the width W2 in the first direction and has the width L2 (will hereinafter referred to as "height" for ease of description) in the second direction that intersects the first direction. Also, the square (or rectangular) wireless signal receiver 353 has the width W3 in the first direction and has the width L3 (will hereinafter referred to as "height" for ease of description) in the second direction intersecting the first direction.

The hole h may be larger than the wireless signal receiver 353. That is, the width W2 and height L2 of the hole h may be greater than the width W3 and height L3 of the wireless signal receiver 353, and this is the case regardless of the shapes of the hole h and the wireless signal receiver 353. Accordingly, a wireless signal can be easily received or transmitted through the hole h. In the present exemplary embodiment, the hole h and the wireless signal receiver 353 are quadrilaterals. However, the present invention is not limited thereto, and the hole h and the wireless signal receiver 353 may have various shapes. Nonetheless, the hole h may still be larger than the wireless signal receiver 353.

The wireless signal receiver 353 is disposed at a location corresponding to the position of the hole h, and in particular, the signal receiver 353 may be disposed at the center of the hole h.

Instead of the wireless signal receiver 353, the wireless signal transmitter or the wireless signal transceiver that is as large as the wireless signal receiver 353 may be located at the same position as the wireless signal receiver 353 and transmit a wireless signal through the hole h. The size of the hole h may be adjusted in view of an angle at which a wireless signal is output from the wireless signal transmitter or the wireless signal transceiver. For example, the width W2 of the hole h may be set to a value corresponding to W3+2D, and the height L2 of the hole h may be set to a value corresponding to L3+2D as shown in the drawing, such that a wireless signal, for example, a beam can be output at an angle of up to 45 degrees. However, the present invention is not limited thereto, and the size of the hole h may vary.

While the present invention has been particularly shown and described with reference to exemplary embodiments thereof, it will be understood by persons of ordinary skill in the art that various changes in form and detail may be made therein without departing from the spirit and scope of the present invention as defined by the disclosure, including the following claims. The exemplary embodiments should be considered in a descriptive sense only and not for purposes of limitation.

What is claimed is:

1. A display device comprising:
   a display panel configured to display an image;
   an upper housing disposed on a front surface of the display panel and including an open window defining a display area;
   a lower housing disposed on a rear surface of the display panel and including a hole formed in a portion of an area of the lower housing corresponding to the display area; and
   a wireless communication module disposed on a rear surface of the lower housing configured to transmit or receive a wireless signal through the hole,
   wherein when the hole has a width of W2 in a first direction and has a width of L2 in a second direction that intersects the first direction, the wireless signal transceiver has a width of W3 in the first direction and has a width of L3 in the second direction, and when the hole is separated from the wireless signal transceiver by a gap D, W2 has a value corresponding to W3+2D, and L2 has a value corresponding to L3+2D.

2. The display device of claim 1, wherein the wireless communication module comprises a wireless signal transceiver which transmits or receives the wireless signal, wherein the wireless signal transceiver is placed in a position that corresponds to a position of the hole.

3. The display device of claim 2, wherein the hole is larger than the wireless signal transceiver.

4. The display device of claim 2, wherein the wireless signal transceiver is implemented as a radio frequency (RF) chip.

5. The display device of claim 2, wherein the wireless communication module further comprises a controller configured to control an operation of the wireless communication module, wherein the wireless signal transceiver is loaded on a first board, the controller is loaded on a second board, and the first and second boards are disposed adjacent to each other.

6. The display device of claim 2, wherein the wireless signal transceiver is configured to receive from an image processing device a wireless signal generated based on an image signal.

7. The display device of claim 1, further comprising a backlight assembly which is interposed between the rear surface of the display panel and a front surface of the lower housing and emits light to the display panel.

8. The display device of claim 2, wherein the upper housing comprises outer sidewalls and a bezel portion extending inwards from the outer sidewalls and surrounding the open window, wherein the wireless signal transceiver and the hole are not overlapped by the bezel portion.

9. A system for wirelessly transmitting/receiving an image signal, the system comprising:
   an image processing device configured to receive an image signal from an external source, generate a wireless signal based on the received image signal, and output the wireless signal; and
   a display device configured to receive the wireless signal from the image processing device and display an image based on the received wireless signal,
   wherein the display device comprises:
   a display panel configured to display an image;
   an upper housing which is disposed on a front surface of the display panel and including an open window defining a display area;
   a lower housing disposed on a rear surface of the display panel and including a hole formed in a portion of an area of the lower housing corresponding to the display area; and
   a first wireless communication module disposed on a rear surface of the lower housing and configured to at least receive the wireless signal through the hole,
   wherein when the hole has a width of W2 in a first direction and has a width of L2 in a second direction that intersects the first direction, the wireless signal transceiver has a width of W3 in the first direction and has a width of L3 in the second direction, and when the hole is separated from the wireless signal transceiver by a gap D, W2 has a value corresponding to W3+2D, and L2 has a value corresponding to L3+2D.

10. The system of claim 9, wherein the image processing device comprises a second wireless communication module configured to output the wireless signal, wherein the second wireless communication module and the first wireless communication module of the display device are placed to face each other.

11. The system of claim 9, wherein the first wireless communication module comprises a wireless signal transceiver which has at least a function of receiving the wireless signal, wherein the wireless signal transceiver is placed in a position that corresponds to a position of the hole.

12. The system of claim 11, wherein the hole is larger than the wireless signal transceiver.

13. The system of claim 11, wherein the wireless signal transceiver is implemented as an RF chip.

14. The system of claim 11, wherein the first wireless communication module further comprises a controller configured to control an operation of the first wireless communication module, wherein the wireless signal transceiver is loaded on a first board, the controller is loaded on a second board, and the first and second boards are disposed adjacent to each other.

15. The system of claim 9, wherein the display device further comprises a backlight assembly interposed between the rear surface of the display panel and a front surface of the lower housing and configured to emit light to the display panel.

16. The system of claim 11, wherein the upper housing comprises outer sidewalls and a bezel portion extending inwards from the outer sidewalls and surrounding the open window, wherein the wireless signal transceiver and the hole are not overlapped by the bezel portion.

\* \* \* \* \*